United States Patent
Vo et al.

(10) Patent No.: US 7,146,090 B2
(45) Date of Patent: Dec. 5, 2006

(54) FIBER OPTIC CABLE AND PLUG ASSEMBLY

(75) Inventors: Chanh C. Vo, Mansfield, TX (US); Guy Castonguay, Ft. Worth, TX (US); Hieu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 109 days.

(21) Appl. No.: 10/870,601

(22) Filed: Jun. 17, 2004

(65) Prior Publication Data

US 2005/0281510 A1 Dec. 22, 2005

(51) Int. Cl.
*G02B 6/00* (2006.01)
*G02B 6/36* (2006.01)

(52) U.S. Cl. .................. 385/138; 385/53; 385/139
(58) Field of Classification Search .......... 385/53, 385/138, 139
See application file for complete search history.

(56) References Cited

U.S. PATENT DOCUMENTS

| | | | |
|---|---|---|---|
| 4,699,456 A | 10/1987 | Mackenzie | 350/96.2 |
| 4,705,352 A | 11/1987 | Margolin et al. | 350/96.2 |
| 4,729,628 A | 3/1988 | Kraft et al. | 350/96.23 |
| 5,042,901 A | 8/1991 | Merriken et al. | 385/135 |
| 5,199,095 A | 3/1993 | Iapicco | 385/100 |
| 5,283,849 A | 2/1994 | Cooke et al. | 385/77 |
| 5,283,853 A * | 2/1994 | Szegda | 385/139 |
| 5,371,821 A * | 12/1994 | Szegda | 385/87 |
| 5,425,121 A * | 6/1995 | Cooke et al. | 385/112 |
| 5,692,090 A * | 11/1997 | Szegda | 385/139 |
| 5,745,633 A | 4/1998 | Giebel et al. | 385/136 |
| 5,778,122 A | 7/1998 | Giebel et al. | 385/55 |
| 5,892,870 A | 4/1999 | Fingler et al. | 385/59 |
| RE36,592 E | 2/2000 | Giebel et al. | 385/100 |
| RE37,028 E | 1/2001 | Cooke et al. | 385/112 |
| 6,178,283 B1 * | 1/2001 | Weigel | 385/139 |
| 6,222,977 B1 | 4/2001 | Kawada et al. | 385/136 |
| 6,234,683 B1 | 5/2001 | Waldron et al. | 385/78 |
| 6,501,888 B1 | 12/2002 | Gimblet et al. | 385/113 |
| 6,542,674 B1 | 4/2003 | Gimblet | 385/113 |
| 6,579,014 B1 | 6/2003 | Melton et al. | 385/76 |
| 6,648,520 B1 | 11/2003 | McDonald et al. | 385/78 |
| 6,754,430 B1 * | 6/2004 | Kuehne | 385/138 |
| 2002/0067894 A1 | 6/2002 | Scanzillo | |

* cited by examiner

*Primary Examiner*—Brian Healy
*Assistant Examiner*—Derek L. Dupuis
(74) *Attorney, Agent, or Firm*—Jeffrey S. Bernard

(57) ABSTRACT

A fiber optic cable has a plug assembly that may be positioned and secured at any desired location along the length of the cable to engage a receptacle disposed within a connector port provided in a wall of a connection terminal. The plug assembly includes a shroud, a coupling nut, a heat shrink tube for sealing the cable and a boot for providing bending strain relief. At least a portion of the cable passes through the connector port for interconnection with optical fibers of a distribution cable or optical equipment. A method for routing a fiber optic cable into a connection terminal includes using a connector port provided in a wall of the terminal, determining a desired length of the cable, positioning and securing a plug assembly at a desired location along the length of the cable, and mating the plug assembly with a receptacle disposed within the connector port.

12 Claims, 10 Drawing Sheets

FIBER OPTIC CABLE AND PLUG ASSEMBLY

BACKGROUND OF THE INVENTION

1. Field of the Invention

The present invention relates generally to a fiber optic cable and plug assembly for a fiber optic communications network, and more specifically, to a secondary distribution cable having a plug assembly that may be positioned and secured at any desired location along the length of the cable.

2. Description of the Related Art

Optical fiber is increasingly being used for a variety of broadband applications including voice, video and data transmissions. As a result of the ever-increasing demand for broadband communications, fiber optic networks are being expanded to provide services to an end user, commonly referred to as a subscriber. In this regard, fiber optic networks are being developed that deliver "fiber-to-the-curb" (FTTC), "fiber-to-the-business" (FTTB), "fiber-to-the-home" (FTTH), and "fiber-to-the-premises" (FTTP), referred to generically as "FTTx."

In order to reduce installation labor costs in FTTx networks, communications service providers are increasingly demanding factory-prepared interconnection solutions, commonly referred to as "plug-and-play" systems. In the current development of plug-and-play systems, network connection terminals comprising connector ports are provided at interconnection points to establish optical connections between terminated optical fibers of a distribution cable and respective optical fibers of one or more extended distribution cables, branch cables or drop cables. As a result of the increase in interconnection points, fiber optic networks must include an ever-increasing number of connection terminals, examples of which include, but are not limited to, network access point (NAP) enclosures, aerial closures, below grade closures, pedestals and network interface devices (NIDs). Via these connection terminals, terminated optical fibers of a distribution cable are interconnected with one or more optical fibers of an extended distribution cable, a branch cable or a drop cable, collectively referred to herein as a "secondary distribution cable". In addition, as a result of the increase in interconnection points, secondary distribution cables of varying lengths are needed for providing optical connections between distribution cables, connection terminals and subscriber premises. Regardless of the type of connection terminal and cable provide at the interconnection point, the terminal must include at least one opening through an external wall of the terminal operable for receiving a distribution cable and at least one connector port provided in an external wall or an internal wall of the terminal for receiving a secondary distribution cable. The connection terminal must also provide protection for the cables and their respective optical fibers against adverse environmental and mechanical influences, such as from water intrusion and tensile forces, and more particularly, for the optical connections (i.e., fusion splices, mechanical splices, adapter connector sleeves, etc.) at which the optical fibers are interconnected.

It would be advantageous to utilize an existing connector port in an external wall or an internal wall of a connection terminal for something other than interconnecting an optical fiber of a distribution cable with an optical fiber of a drop cable. Since the connector port typically comprises a receptacle for receiving a mating plug, an unoccupied receptacle could be used to provide a robust connection and strain relief for a fiber optic cable, and in particular, a secondary distribution cable. As yet however, there is an unresolved need for a fiber optic cable and plug assembly adapted to utilize a connector port provided in an external wall or an internal wall of a connection terminal to route more than one optical fiber of the distribution cable to a remote location. There is a further unresolved need for such a fiber optic cable and plug assembly that is adapted to be strain relieved by a connector port at any desired location along the length of the cable. There also continues to be a further unresolved need for a secondary distribution cable whose length can be set in the field by readily positioning and securing a plug assembly at a desired location along the length of the cable such that optical fibers of the secondary distribution cable extend into a network connection terminal.

BRIEF SUMMARY OF THE INVENTION

To achieve the foregoing and other objects, and in accordance with the purposes of the invention as embodied and broadly described herein, the present invention provides various embodiments of a fiber optic cable and plug assembly, and more particularly, a fiber optic cable having a plug assembly that may be positioned and secured at any desired location along the length of the cable. Thus, the present invention provides a fiber optic cable, referred to herein as a secondary distribution cable, whose length may be readily adjusted either in the factory or the field so that the cable may be used regardless of the distance between interconnection points. The present invention further provides a length of fiber optic cable and a plug assembly adapted to engage a receptacle of a connector port provided in an external wall or an internal wall of a network connection terminal.

In an exemplary embodiment, the present invention provides a plug assembly for a fiber optic cable, wherein a portion of the fiber optic cable continues beyond the plug assembly when the plug assembly engages a receptacle of a connector port provided in an external wall or an internal wall of a network connection terminal. The plug assembly is adapted to be positioned and secured at any desired location along the length of the cable, and thus, includes a plug shroud secured at the desired location along the length of the fiber optic cable. A forward portion of the plug shroud has one or more extensions at one end for mating with a receptacle disposed within a connector port provided in an external wall or an internal wall of the connection terminal. In one embodiment, at least two extensions of the plug shroud have different profiles for keying the plug assembly with the receptacle. The plug assembly further includes a coupling nut operable for securing the plug assembly to the receptacle, a heat shrink tube disposed about a rearward portion of the plug shroud and the cable jacket for sealing the fiber optic cable, and a boot for providing bending strain relief to the fiber optic cable near the plug assembly. In a further embodiment, the plug assembly includes a crimp body made up of two mating halves defining a clamping portion for securing a strength component of the fiber optic cable, and a crimp band for securely holding the two halves of the crimp body together. The plug shroud may be secured to the fiber optic cable using the crimp body and the crimp band. Alternatively, the crimp body and the crimp band may be eliminated and the plug shroud secured to the fiber optic cable using an adhesive material, such as epoxy resin or potting compound.

In another embodiment, the present invention provides a method for routing a fiber optic cable into a connection terminal in a fiber optic communications network. The method includes using a connector port provided in an external wall or an internal wall of the connection terminal, determining a desired length of the fiber optic cable, positioning and securing a plug assembly at a desired location along the length of the fiber optic cable, and mating the plug assembly with a receptacle disposed within the connector port. At least a portion of the fiber optic cable continues beyond the plug assembly and the receptacle into the connection terminal. Preferably, the fiber optic cable is a secondary distribution cable selected from the group consisting of an extended distribution cable, a branch cable and a drop cable, such as a flat dielectric drop cable, a figure-eight drop cable or an armored drop cable.

In yet another embodiment, the present invention provides a fiber optic cable assembly including a fiber optic cable having a cable jacket and an optical transmission component disposed within the cable jacket, and a plug assembly adapted to be positioned and secured at any desired location along the length of the fiber optic cable. The plug assembly includes a plug shroud secured at the desired location and the plug shroud has means for mating the plug assembly with a receptacle disposed within a connector port provided in an external wall or an internal wall of a network connection terminal. The plug assembly further includes a coupling nut operable for securing the plug assembly to the receptacle, a heat shrink tube disposed about a rearward portion of the plug shroud and the cable jacket for sealing the fiber optic cable, and a boot for providing bending strain relief to the fiber optic cable near the plug assembly. In a further embodiment, the plug assembly includes a crimp body made up of two mating halves defining a clamping portion for securing a strength component of the fiber optic cable, and a crimp band for securely holding the two halves of the crimp body together. The plug shroud may be secured to the fiber optic cable using the crimp body and the crimp band. Alternatively, the crimp body and the crimp band may be eliminated and the plug shroud may be secured to the fiber optic cable using an adhesive material, such as epoxy resin or potting compound.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
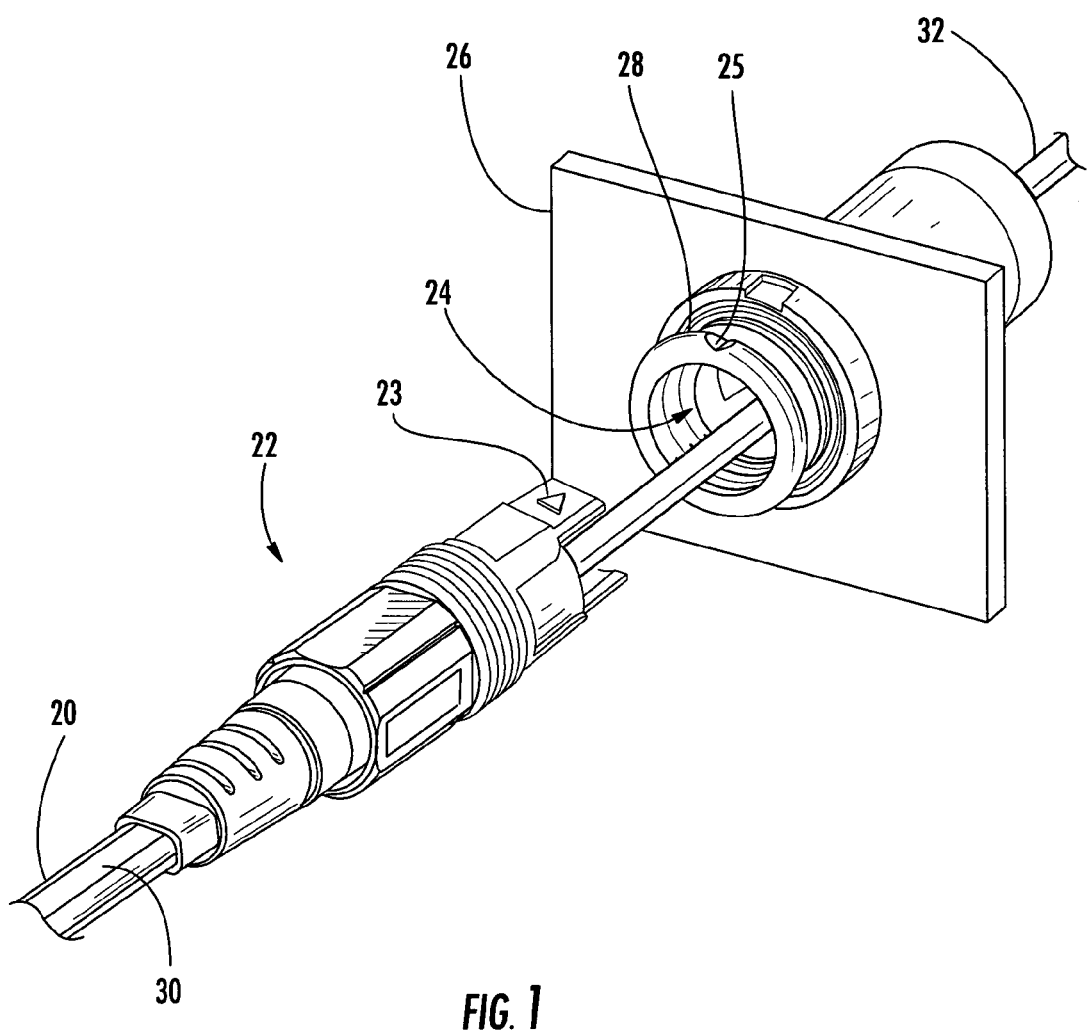
FIG. 1 is a perspective view of a fiber optic cable and plug assembly in accordance with an exemplary embodiment of the present invention shown being routed into a network connection terminal through a connector port provided in a wall of the connection terminal.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In the various embodiments described below, the present invention comprises a fiber optic cable having a plug assembly that may be positioned and secured at any desired location along the length of the cable, thus providing a fiber optic cable whose length may be readily adjusted either in the factory or in the field so that it may be used to establish an optical connection regardless of the distance between interconnection points. In the exemplary embodiments shown and described herein, the fiber optic cable is a secondary distribution cable comprising a plurality of optical fibers for optically connecting a corresponding plurality of optical fibers of a distribution cable with another distribution cable, another network connection terminal or optical equipment at a subscriber premises. As used herein, the term "secondary distribution cable" in intended to include all types of fiber optic cables and typically comprises a lesser number of optical fibers than the distribution cable with which it is interconnected. Examples of such a fiber optic cable include, but are not limited to, an extended distribution cable, a branch cable and a drop cable, such as a flat dielectric drop cable, a figure-eight drop cable or an armored drop cable, used to establish optical connections at an interconnection point between the optical fibers of the secondary distribution cable and a distribution cable or optical equipment in an FTTx communications network. The secondary distribution cable typically comprises between about four optical fibers and about twelve optical fibers. However, the secondary distribution cable may comprise fewer than four optical fibers or more than twelve optical fibers depending on the distribution cable and the type of connection terminal. Furthermore, the particular components of the fiber optic cable and plug assembly described herein may be modified to accommodate a different type of distribution cable and/or secondary distribution cable.

In all embodiments shown and described herein, different types of fiber optic cables may function as the secondary distribution cable such as, but not limited to, monotube, loose tube, central tube, ribbon, flat dielectric drop and the like. However, in preferred embodiments, the secondary distribution cable comprises a cable jacket, a strength component and an optical transmission component disposed within the cable jacket. In one embodiment, the strength component comprises two glass-reinforced plastic (GRP) strength components and the optical transmission component comprises an optical waveguide disposed within a central buffer tube. The secondary distribution cable may also comprise strength members that provide additional tensile strength. As used herein, the term "strength component" refers to a strength element having anti-bucking strength, while the term "strength member" refers to a strength element lacking anti-buckling strength. Furthermore, the term "tensile element" refers generically to either a strength component or a strength member. Strength members allow a fiber optic cable to have a smaller cross-sectional footprint due to the fact that they allow the strength components to have smaller diameters since they will not provide all of the tensile strength to the cable. In other words, both the strength components and the strength members carry the tensile load. Moreover, by using strength members, the cable remains relatively flexible and is easier to handle. It is understood that other cable types may be used in conjunction with the present invention. Moreover, various optical connectors may be used with different fiber optic cables according to the concepts of the present invention, thereby resulting in numerous cable/connector combinations. The secondary distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals.

Referring now to FIG. 1, a secondary distribution cable 20 having a plug assembly 22 in accordance with the present invention is shown passing through a connector port 24 located in an external wall or an internal wall, referred to hereinafter as a wall 26, of an enclosure, such as a connection terminal in a fiber optic communications network. In a typical network connection terminal, one or more connector ports 24 are provided in wall 26 of the terminal. Each connector port 24 is operable for receiving a terminated and connectorized optical fiber of a distribution cable on the inside of the connector port 24, and a connectorized optical fiber of a fiber optic branch cable or drop cable on the outside of the connector port 24. The connector port 24 may also include a receptacle 28 for aligning and maintaining the opposing optical connectors in physical contact. It is also envisioned that a single connector port 24 may accommodate more than one optical fiber of the distribution cable, either by receiving a multifiber connector or by receiving multiple single fiber connectors within the receptacle 28.

The plug assembly 22 may be positioned and secured at any desired location along the length of the secondary distribution cable 20, thus allowing the cable 20 to be used between any two interconnection points in an optical network. As shown, the plug assembly 22 is adapted to engage the receptacle 28 of the connector port 24 provided on the connection terminal. Preferably, an alignment indicia 23 of the plug assembly 22 is aligned relative to a corresponding alignment indicia 25 provided on the receptacle 28. By way of example, the secondary distribution cable 20 may function to interconnect one or more optical fibers of a main distribution cable (not shown) to a network connection terminal, such as a network interface device (NID) or optical equipment, at a subscriber premises. The secondary distribution cable 20 may be routed to the subscriber premises in an aerial installation or a buried (below grade) installation. In an aerial installation, for example, a first end of the cable 20 is optically connected to the main distribution cable inside an aerial closure located on a telephone pole, and a second end of the cable 20 is optically connected to communications equipment through a NID located at the subscriber premises. In a buried installation, for example, the first end of the cable 20 is optically connected to the main distribution cable inside a pedestal located on the ground, and a second end of the cable 20 is optically connected to communications equipment through a NID located at the subscriber premises. Regardless, the network connection terminal includes at least one opening or connector port 24 through a wall 26 of the terminal for receiving the secondary distribution cable 20. In preferred embodiments, the connector port 24 comprises a receptacle 28 adapted to engage the plug assembly 22 of the secondary distribution cable 20.

The secondary distribution cable 20 comprises a cable jacket 30 and an optical transmission component 32 disposed within the cable jacket 30. As show in the exemplary embodiment of FIGS. 1–4, the cable jacket 30 terminates at the plug assembly 22, while the optical transmission component 32 containing the optical fibers of the cable 20 continues through the connector port 24 inside the connection terminal. In one exemplary embodiment, the optical transmission component 32 terminates within the network connection terminal, where the optical fibers are spliced or otherwise optically connected to one or more optical fibers of a main distribution cable terminated within the connection terminal. In another exemplary embodiment, the optical transmission component 32 continues through the network connection terminal to optical communications equipment within a subscriber premises, such as an office inside a building. By connecting the plug assembly 22 to the network connection terminal and continuing the optical transmission component 32 inside the subscriber premises, the secondary distribution cable 20 is strain relieved at the network connection terminal and the optical fibers are protected by the optical transmission component (e.g., buffer tube) between the terminal and the optical communications equipment. Alternatively, the optical fibers of the secondary distribution cable 20 may be spliced to a predetermined length of optical fiber having an optical connector mounted on the end (i.e., a pigtail), or may be pre-connectorized so that the secondary distribution cable 20 can be readily interconnected with connectorized optical fibers of the main distribution cable or with connectors provided on optical communications equipment.

Figure 2:
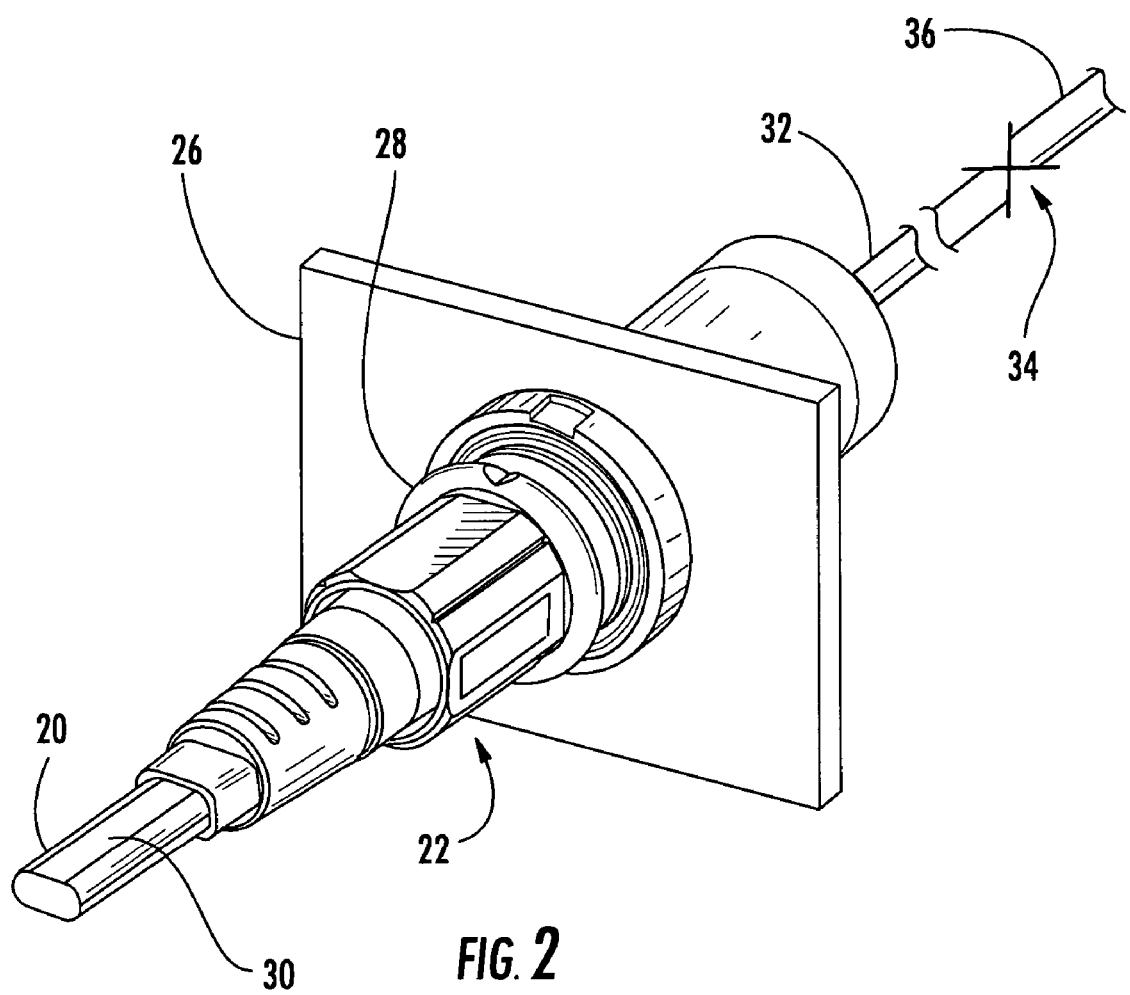
FIG. 2 is a perspective view of the fiber optic cable and plug assembly of FIG. 1 shown with the plug assembly engaging a receptacle disposed within the connector port and at least one optical fiber of the fiber optic cable optically connected to at least one optical fiber within the connection terminal.

Referring to FIG. 2, the secondary distribution cable shown in FIG. 1 is received within the connector receptacle 28 and is optically connected at optical connection point 34 to one or more optical fibers 36 within the connection terminal beyond the wall 26. The optical transmission component 32 may have any desired length depending on the type of connection terminal and the location of the optical fibers 36. FIG. 2 illustrates a robust mated connection between the plug assembly 22 and the receptacle 28, thereby making a physical connection that transfers tensile forces placed upon the plug assembly 22 to the receptacle 28, which in turn transfers the tensile forces to the wall 26 of the connection terminal. As readily apparent, no special equipment, training or skill is required to make the physical connection. Thus, installing the secondary distribution cable 20 into the network is efficient and cost effective. In this example, the plug assembly 22 is secured to the receptacle 28 by a threaded engagement; however, other suitable means for securely establishing the physical connection are envisioned. For example, the plug assembly 22 may be secured to the receptacle 28 by a quarter-turn lock, a quick release, a push-pull latch or a bayonet configuration.

Figure 3:
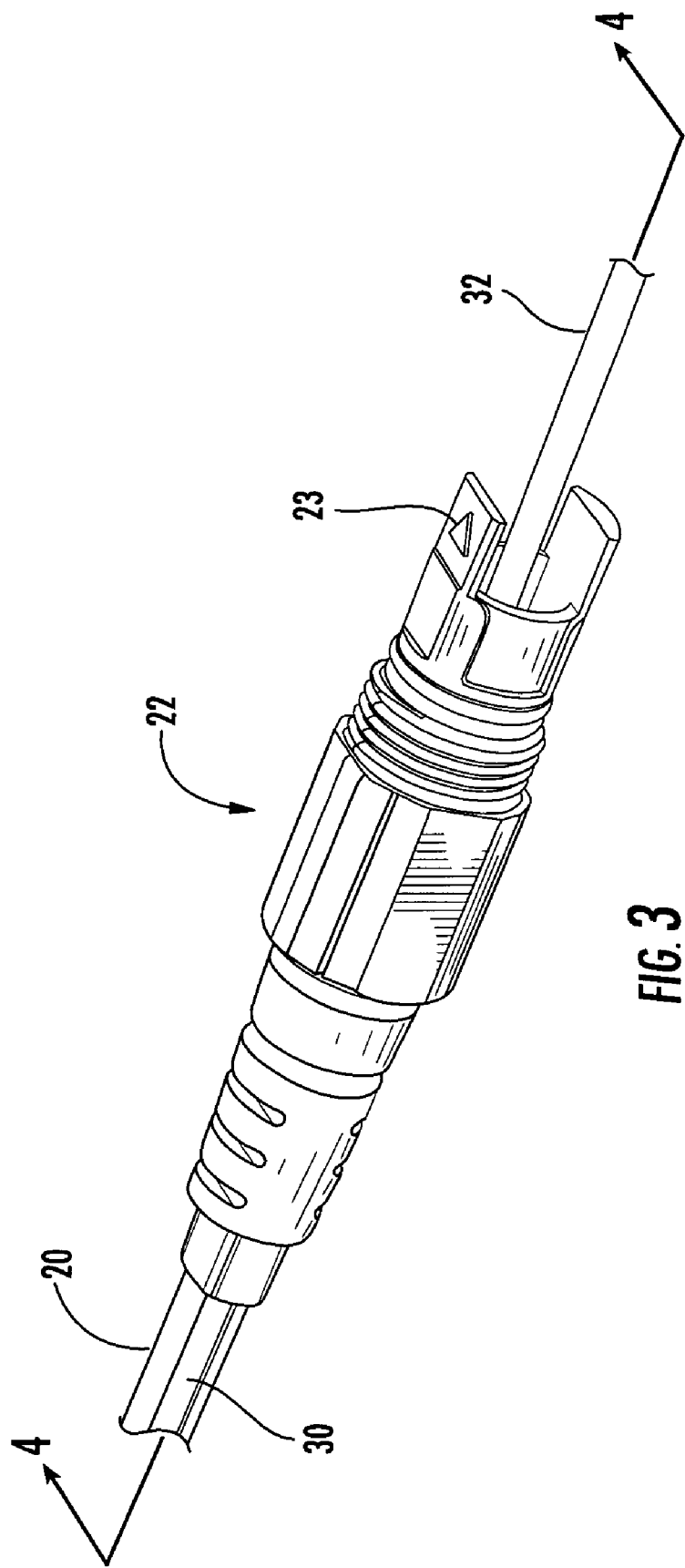
FIG. 3 is a perspective view of a fiber optic cable in accordance with an exemplary embodiment of the present invention having a plug assembly that may be positioned and secured at any desired location along the length of the cable wherein the cable jacket terminates at the plug assembly.

Referring to FIG. 3, a perspective view of an assembled secondary distribution cable 20 having a plug assembly 22 is shown wherein the cable jacket 30, strength components and strength members terminate at a desired location along the length of the cable 20. The plug assembly 22 is positioned and secured at the desired location along the length of the cable 20. As best shown in the alternative embodiment depicted in FIG. 7, the secondary distribution cable 20 illustrated herein comprises an optical transmission component 32 having at least one optical fiber loosely contained therein. In a preferred embodiment, the optical transmission component 32 is centrally disposed between at least two strength components 38 and a plurality of strength members (not shown). Preferably, strength components 38 are solid, rod-like members formed of a dielectric material. The strength components 38 have both tensile and anti-buckling characteristics. The bending modulus of a strength component 38 can be at least twice that of a strength member, thus the strength components are relatively stiff in comparison to the strength members. The strength members are preferably tensile strength members, formed of a group of fiberglass strands. Most preferably, the strength members are multifunctional, including fibrous strength members and a super-absorbent material disposed on and between the strength fibers. The super-absorbent material provides water-blocking protection for inhibiting the migration of water into the cable. The combination of strength components 38 and strength members, with their respective tensile strength ratings, allows the cable 20 to withstand high tensile loads and yet have a suitable overall bending flexibility. The optical transmission component 32 and strength components 38 are surrounded by cable jacket 30 formed of a thermoplastic, e.g., PVC or MDPE.

In the embodiment shown, the cable 20 contains up to about twelve optical fibers and has a generally flat configuration. Thus, cable 20 shown and described herein is commonly referred to as a flat dielectric drop cable. The strength components 38 are located generally adjacent to the optical transmission component 32 with the strength members positioned therebetween. At least one, but preferably both, of the strength members 38 are generally in contact with at least a portion of the optical transmission component 32. At least one, but preferably all, of the strength members are generally in contact with one or the other of the optical transmission component 32 and a strength component 38, but most preferably the strength members are generally in contact with both.

Figure 4:
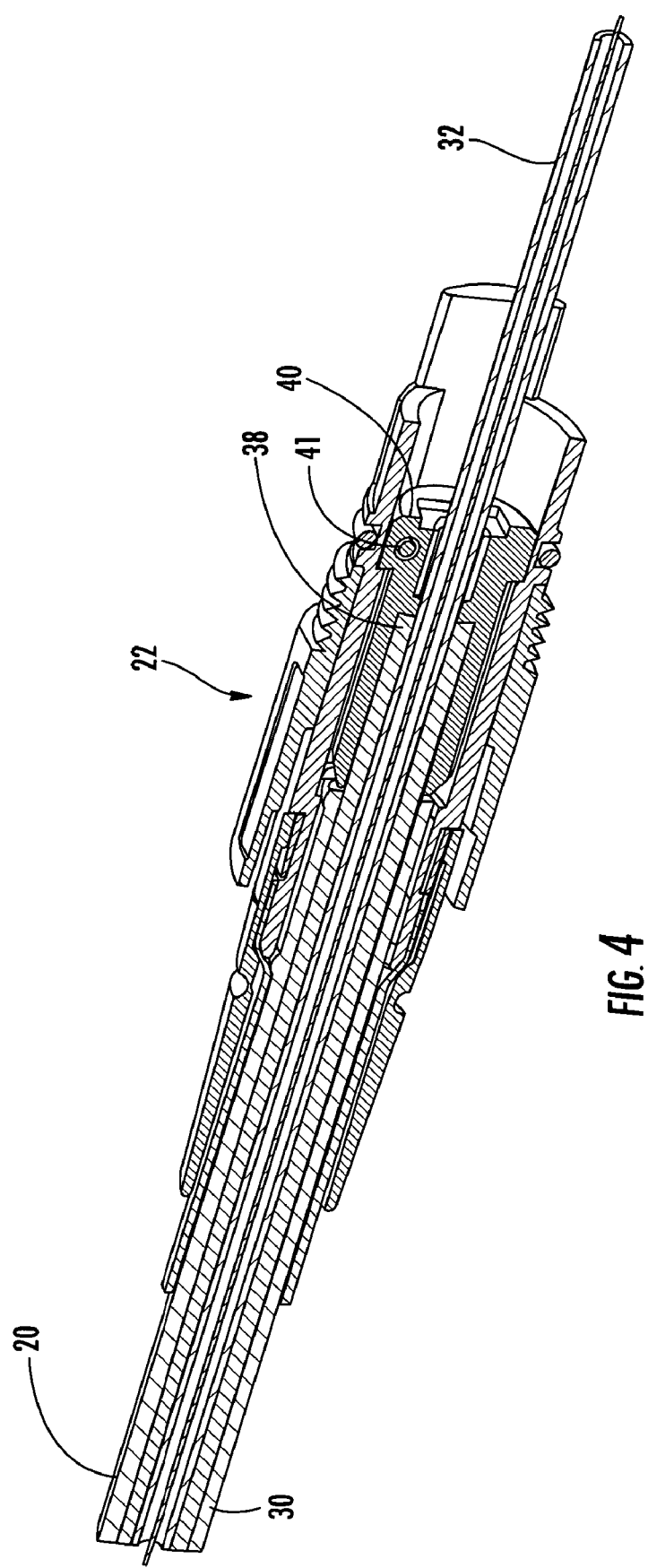
FIG. 4 is a cross-sectional view of the fiber optic cable of FIG. 3 taken along the line 4—4.

Referring to FIG. 4, a cross-sectional view of the secondary distribution cable 20 having a plug assembly 22 is shown. A portion of the plug assembly 22 is positioned over the cable jacket 30, and a portion is positioned over the optical transmission component 32 with the jacket 30 removed. The strength components 38 are terminated within the plug assembly 22 and a two-piece crimp body 40 is secured around the strength components 38 and the optical transmission component 32. The strength members (not shown) are cut flush with the stripped back jacket 30, thereby exposing the two GRP strength components 38 and optical component 32 adjacent the end of the cable 20. Only one half-shell of the crimp body 40 is illustrated since the crimp body 40 defines two symmetrical, and therefore identical, half-shells. In other embodiments there may be a first half-shell and a second half-shell that is different from the first half-shell. For example, one half-shell may have two alignment pins, rather than each half-shell having a single alignment pin 41.

The half-shelves of the crimp body 40 provide strain relief for the cable 20. A longitudinal axis is formed near the center of crimp body 40, through which half of a longitudinal passage is formed. When assembled, the optical transmission component 32 passes through the longitudinal passage and is held in place. The crimp body 40 further includes two passageways generally disposed along the longitudinal axis. The two passageways are used to securely clamp the strength components 38 after a crimp band is crimped about the crimp body 40. Moreover, the two passageways and longitudinal passage are sized for the components of cable 20, but may be sized for different cable configurations. Additionally, the crimp body 40 may include one or more bores for inserting an adhesive or epoxy into the crimp body 40, thereby providing a secure connection for strain relief.

Figure 5:
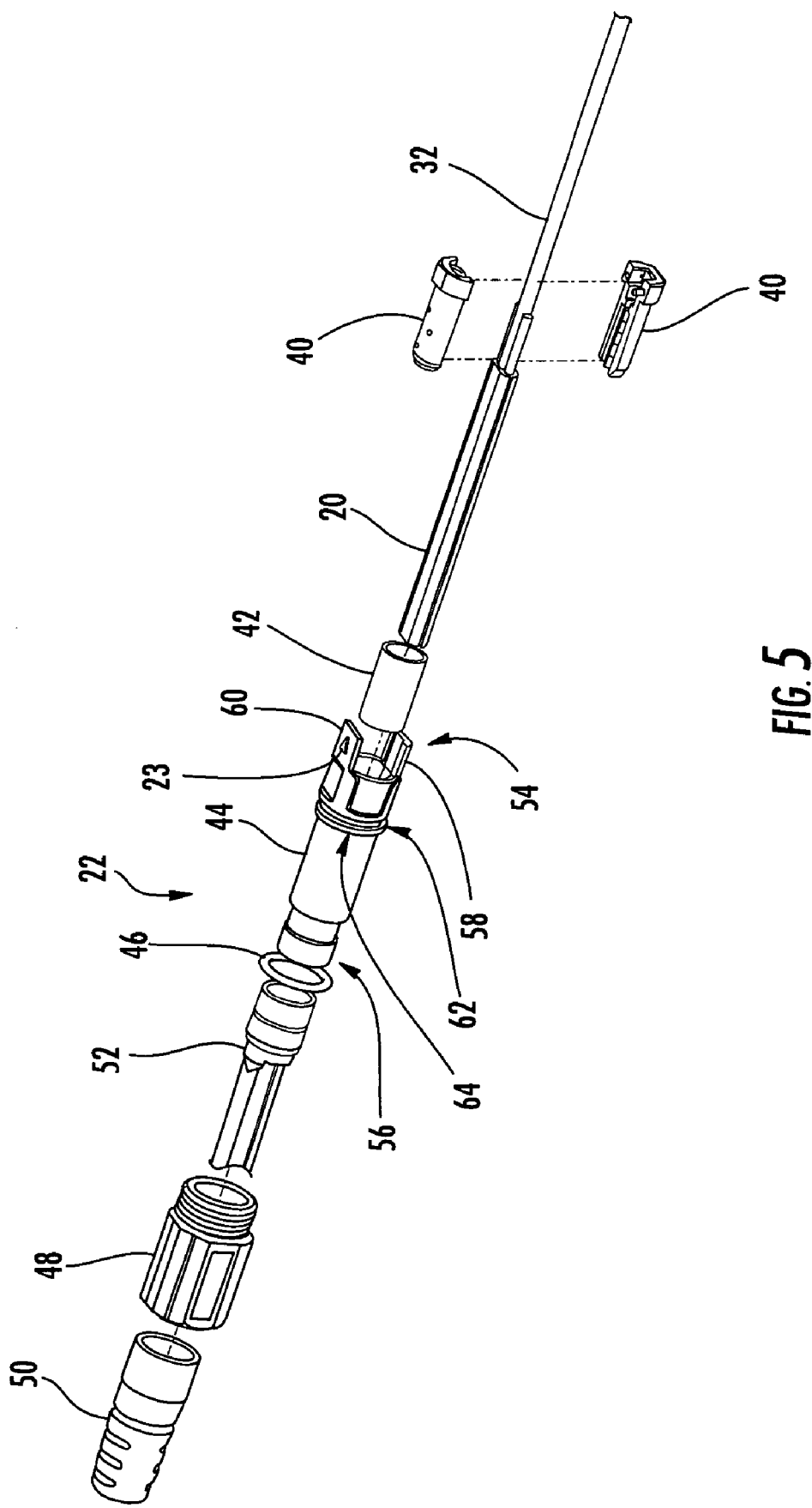
FIG. 5 is an exploded perspective view of the fiber optic cable of FIG. 3.
Figure 6:
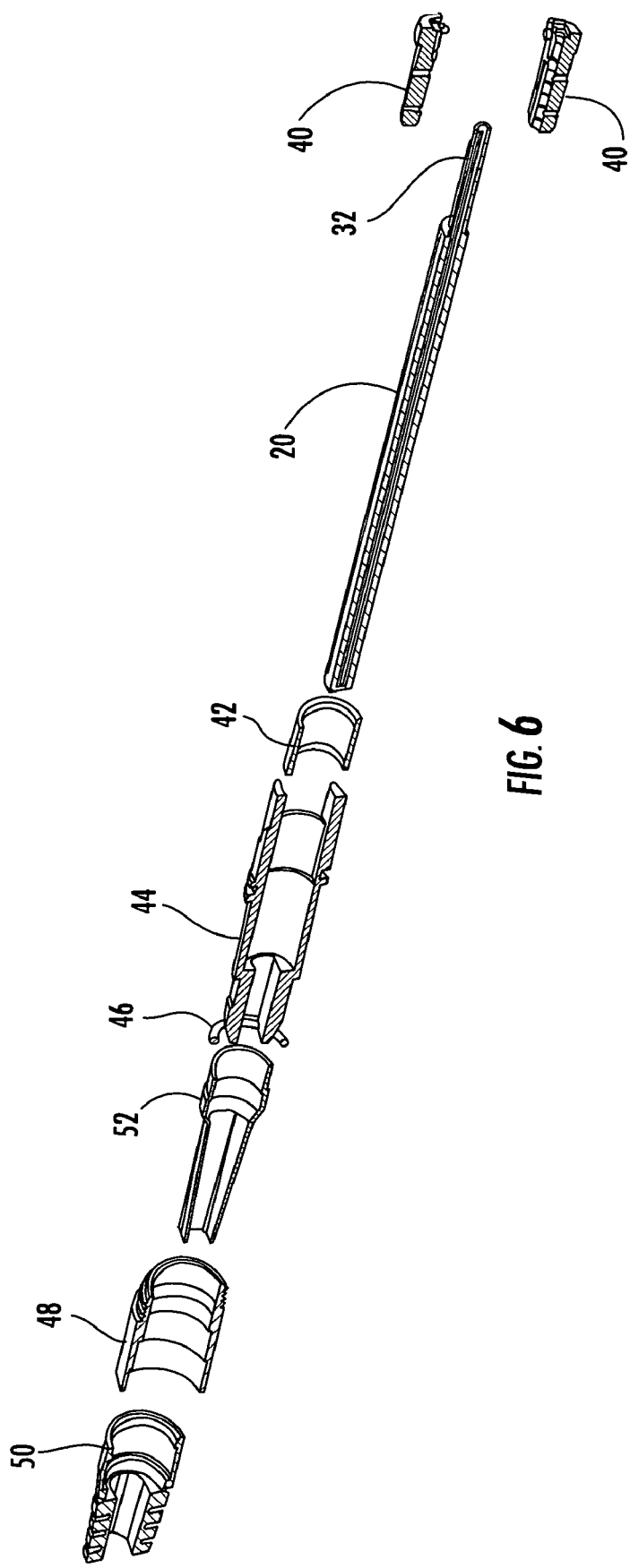
FIG. 6 is an exploded cross-sectional view of the fiber optic cable of FIG. 3 as shown in FIG. 5.

Referring to FIG. 5, an exploded perspective view of the secondary distribution cable 20 having a plug assembly 22 is shown. The plug assembly 22 includes the two-piece crimp body 40, a crimp band 42, a shroud 44 having an O-ring 46, a coupling nut 48, a cable boot 50 and a heat (or cold) shrink tube 52. Generally speaking, most of the components of the plug assembly 22 are formed from a suitable polymer. Preferably, the polymer is a UV stabilized polymer such as ULTEM 2210 available from GE Plastics; however, other suitable materials made also be used. For example, stainless steel or any other suitable metal may be used for various components. FIG. 6 shows a cross-sectional view of the secondary distribution cable 20 and plug assembly 22 shown in FIG. 5.

The crimp body 40 comprises two half-shells that are held together by the crimp band 42 when the plug assembly 22 is assembled. Although the term half-shell is used, it is to be understood that it means suitable shells and includes shells that are greater than or less than half of the crimp body 40. The crimp band 42 is preferably made from brass, but other suitable deformable materials may be used. The crimp body 40 is configured for securing the plug assembly 22, as well as providing strain relief to the cable 20. The crimp body 40 allows the plug assembly 22 to be readily assembled.

The shroud 44 has a generally cylindrical shape with a forward first end 54 and a rearward second end 56. The shroud 44 generally protects the crimp body 40 and in preferred embodiments also keys engagement of the plug assembly 22 with the mating receptacle 28. Moreover, the shroud 44 includes a through passageway between the first and second ends 54 and 56. The passageway of the shroud 44 is keyed so that the crimp body 40 is inhibited from rotating when the plug assembly 22 is assembled. Additionally, the passageway has an internal shoulder (not shown) that inhibits the crimp body 40 from being inserted beyond a predetermined position. The first end 54 of the shroud 44 includes an opening defined by the shroud 44. The opening extends from a medial portion of the shroud 44 to the first end 54. In this embodiment, the shroud 44 includes a pair of openings on opposite sides of the first end 54, thereby defining alignment portions or extensions 58 and 60. In addition to aligning the shroud 44 with the receptacle 28 during mating, the extensions 58 and 60 may extend slightly beyond the end face of a connector that is typically disposed within the plug assembly 22, thereby protecting the same. In the embodiments shown and described herein, however, the optical fibers of the cable 20 are not terminated and connectorized at the plug assembly 22, but instead pass through the plug assembly 22 into the connection terminal. As shown in FIG. 5, the extensions 58 and 60 have slightly different shapes so that the plug assembly 22 and receptacle 28 mate in only one orientation. In preferred embodiments, this orientation is marked on the shroud 44 using alignment indicia 23 so that a less skilled field technician can readily mate the cable 20 with the receptacle 28. In this case, the alignment indicia 23 is an arrow molded into the top alignment extension 60 of the shroud 44, however, other suitable indicia may be used. As best shown in FIG. 1, the alignment indicia 23 is aligned with complimentary alignment indicia 25 disposed on the receptacle 28. Thereafter, the field technician engages the external threads of the coupling nut 48 with the internal threads of the receptacle 28 to secure the plug assembly 22 to the receptacle 28.

A medial portion of the shroud 44 has a groove 62 for seating an O-ring 46. The O-ring 46 provides a weatherproof seal between the plug assembly 22 and the receptacle 28. The medial portion also includes a shoulder 64 that provides a stop for the coupling nut 48. The coupling nut 48 has a passageway sized so that it fits over the second end 56 of the shroud 44 and easily rotates about the medial portion of the shroud 44. In other words, the coupling nut 48 cannot move beyond the shoulder 64, but is able to rotate with respect to the shroud 44. The second end 56 of the shroud 44 includes a stepped down portion having a relatively wide groove. This stepped down portion and groove are used for securing the heat shrink tubing 52. The heat shrink tubing 52 is to form a seal between the shroud 44 and the cable 20. Specifically, the stepped down portion and groove allow for attachment of the heat shrink tubing 52 to the second end 56 of the shroud 44. The rearward end of heat shrink tubing 52 is attached to the cable jacket 30, thereby inhibiting water from entering the plug assembly 22. It will be understood and appreciated by those or skill in the art that the term "heat shrink tubing" is intended to encompass any deformable sealing material, including but not limited to conventional heat shrink and cold shrink tubing.

After the heat shrink tubing 52 is attached, the boot 50 is slid over the heat shrink tubing 52 and a portion of the shroud 44. The boot 50 is preferably formed from a flexible material. The heat shrink tubing 52 and boot 50 generally inhibit kinking and provide bending strain relief to the cable 20 near the plug assembly 22. The boot 50 has a longitudinal passageway with a stepped profile therethrough. The forward end of the boot passageway is sized to fit over the second end 56 of the shroud 44 and heat shrink tubing 52. The rearward end of the boot passageway has a stepped down portion sized for the cable 20 and the heat shrink tubing 52 and acts as a stop for indicating that the boot 50 is fully seated. After the boot 50 is seated, the coupling nut 48 is slid forward on the shroud 44 up to the shoulder 64.

Figure 7:
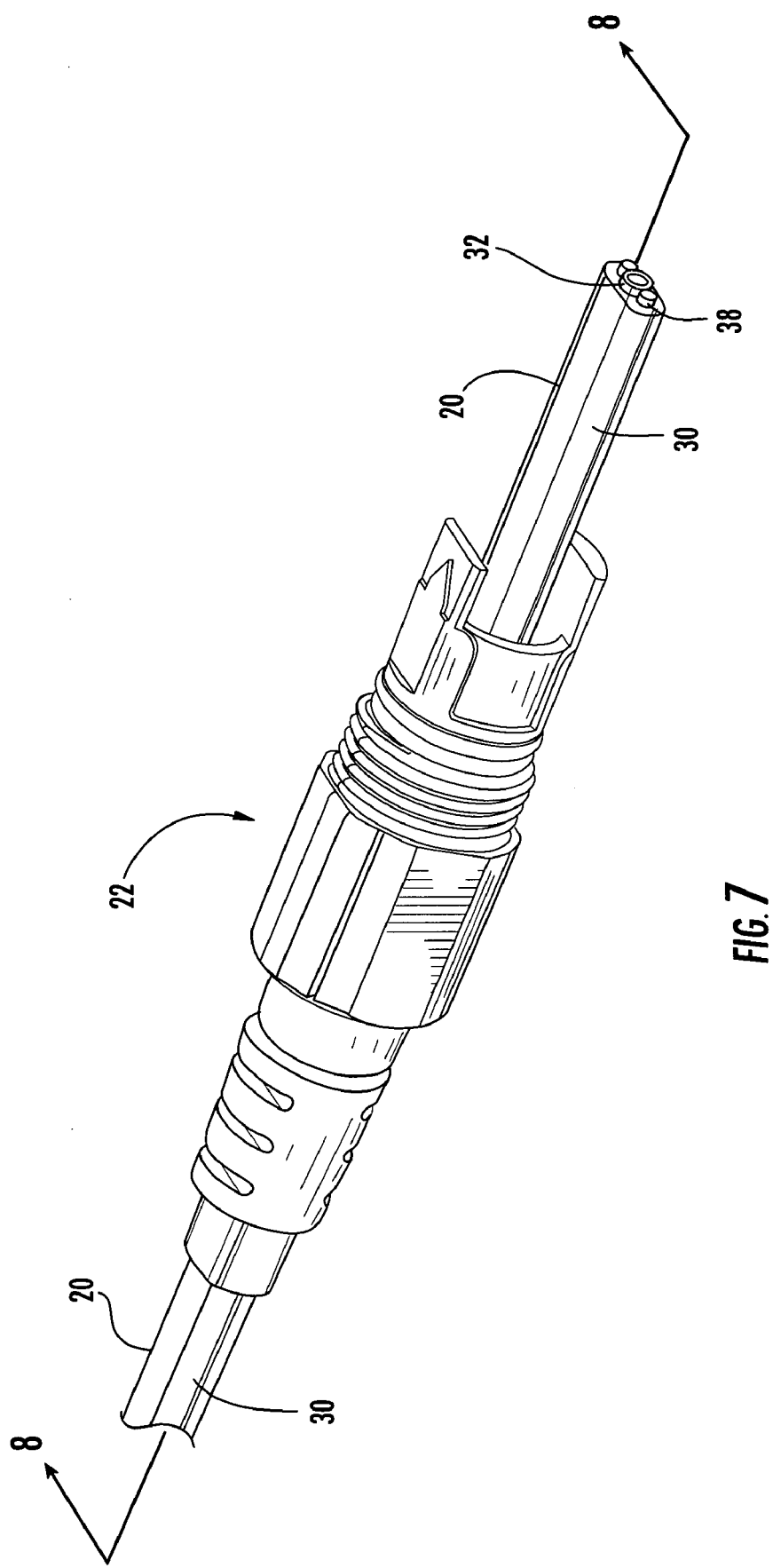
FIG. 7 is a perspective view of a fiber optic cable in accordance with an exemplary embodiment of the present invention having a plug assembly that may be positioned and secured at any desired location along the length of the cable wherein the cable jacket continues beyond the plug assembly.

Referring to FIG. 7, another embodiment of a secondary distribution cable 20 having a plug assembly 22 is shown. In this embodiment, the cable jacket 30 is not removed at the plug assembly 22, but instead passes through the plug assembly 22 into the connection terminal. As with the embodiment shown in FIG. 1, the secondary distribution cable 20 passes through a connector port 24 provided in a wall 26 of a connection terminal. The plug assembly 22 is aligned with and engages a receptacle 28 disposed within the connector port 24. The plug assembly 22 of the secondary distribution cable 20 allows a single connector port 24 of a connection terminal to accommodate more than one optical fiber for optical connection within the connection terminal, for example to a main distribution cable. At the same time, the cable 20 is strain relieved at the connector port 24 and passes through the connector port to the interior of the connection terminal, or to any other desired location.

Figure 8:
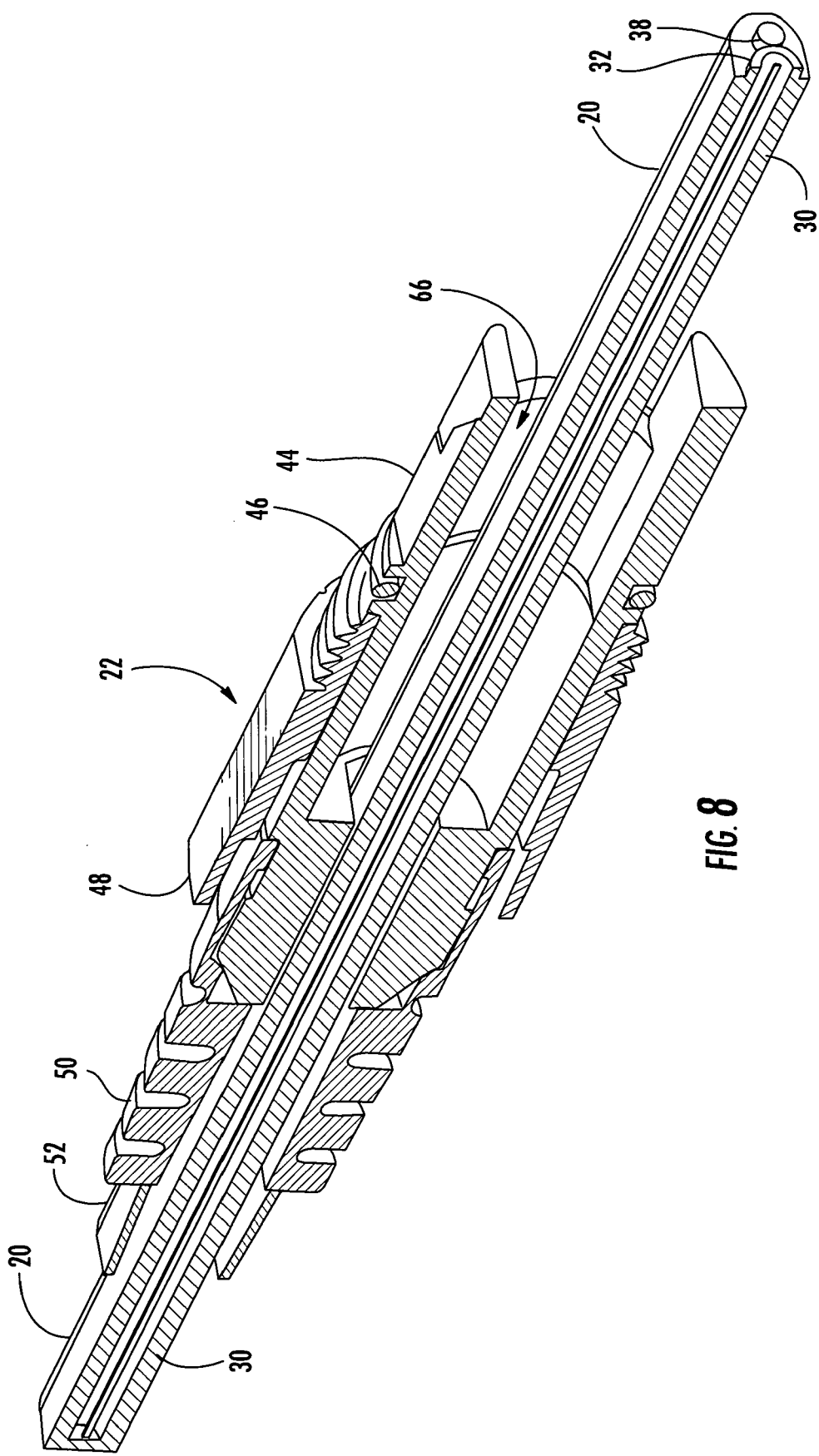
FIG. 8 is a cross-sectional view of the fiber optic cable of FIG. 7 taken along the line 8—8.

As shown in FIG. 8, the plug assembly 22 of this second embodiment includes fewer components than the first embodiment illustrated in FIG. 4. The cable jacket 30, strength components 38 and strength members (not shown) are not cut at the location where the plug assembly 22 is secured to the cable 20. As a result, a two-piece crimp body 40 and a crimp band 42 are not needed. To secure the plug assembly 22 to the cable 20 and to provide sufficient strain relief, epoxy may be injected into the cavity 66 resulting from the absence of the crimp body 40 and crimp band 42. Alternatively, a crimp body 40 and crimp band 42 having a different shape than shown in FIG. 4 may be used. Furthermore, epoxy may be injected into bores defined by the modified crimp body 40.

Figure 9:
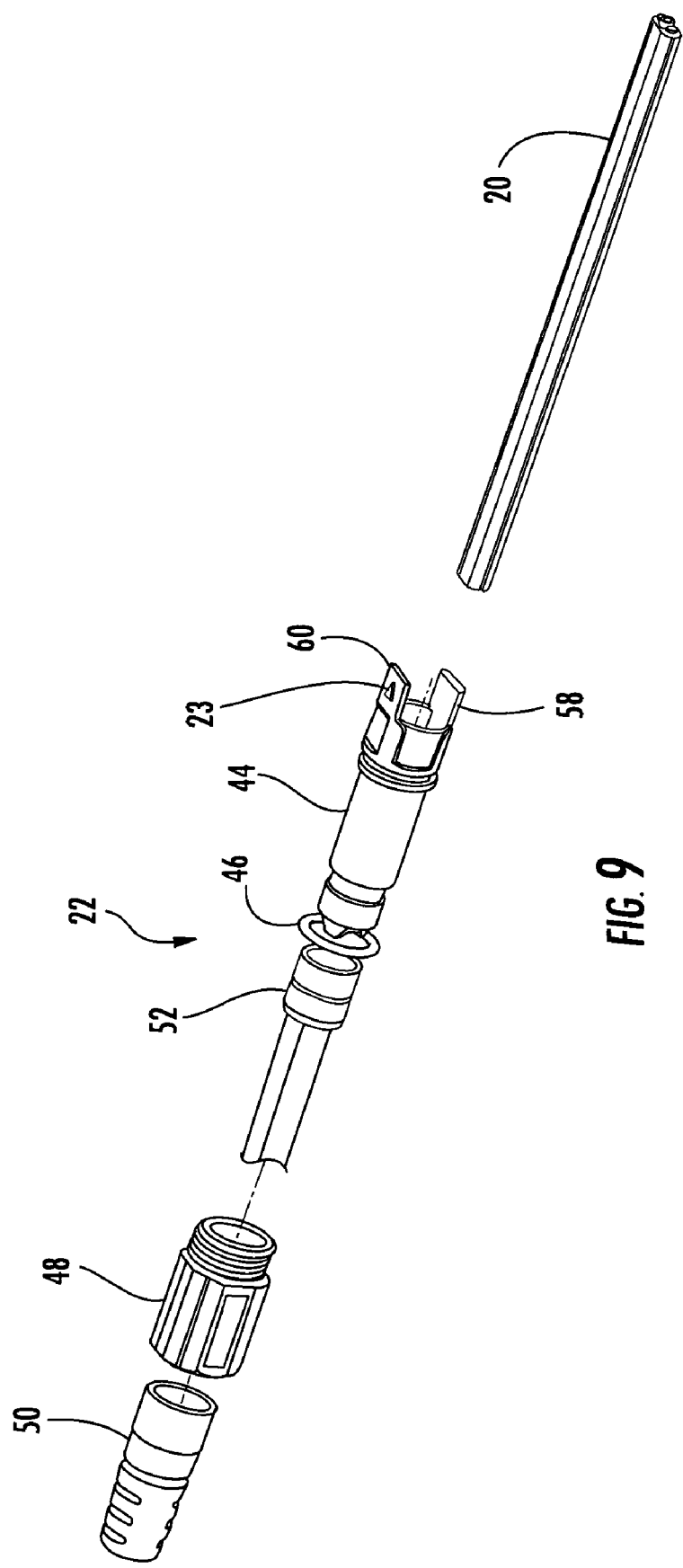
FIG. 9 is an exploded perspective view of the fiber optic cable of FIG. 7.
Figure 10:
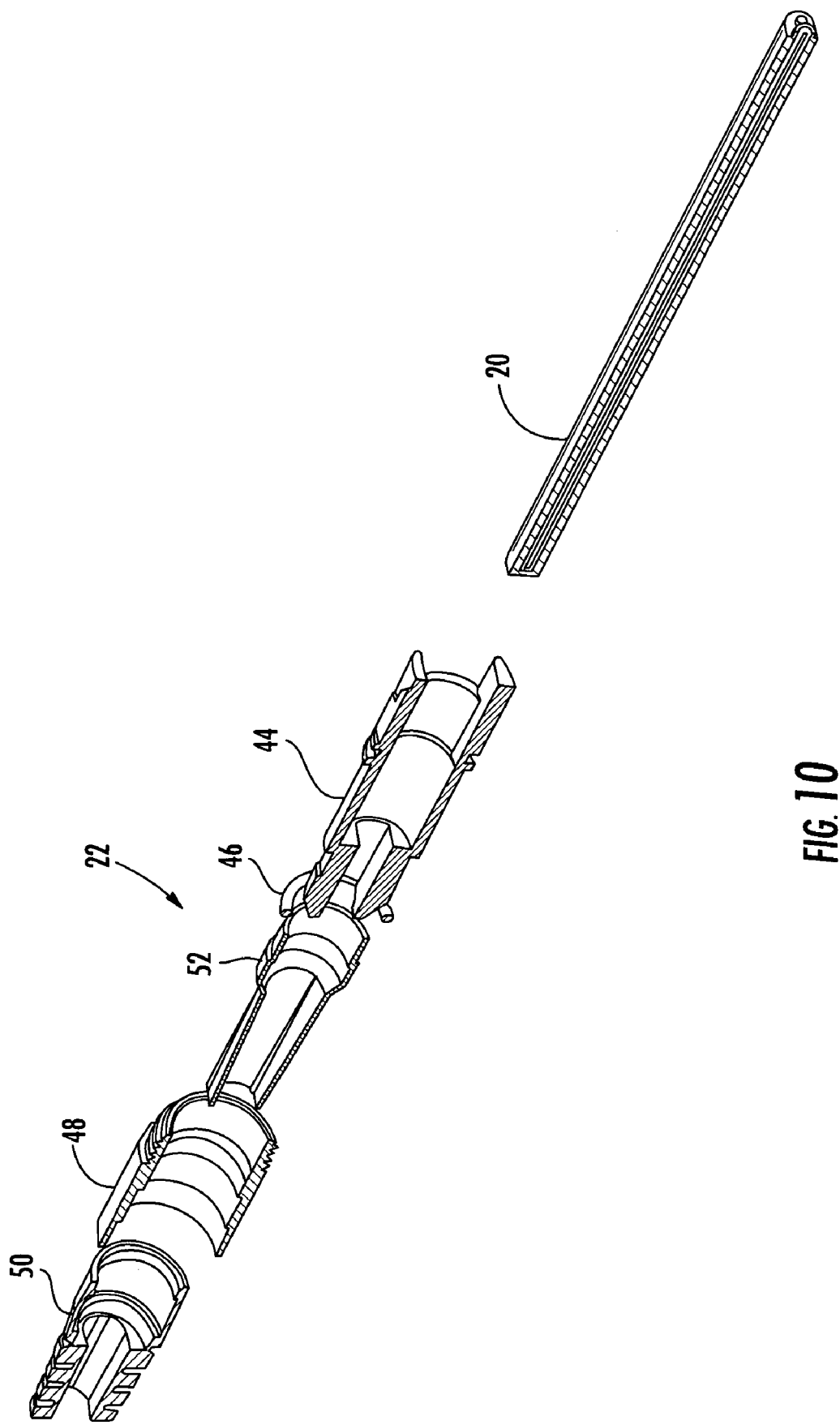
FIG. 10 is an exploded cross-sectional view of the fiber optic cable of FIG. 7 as shown in FIG. 9.

Referring to FIG. 9, an exploded perspective view of the secondary distribution cable 20 having a plug assembly 22 shown in FIG. 8 is illustrated. In this embodiment, the plug assembly 22 includes a shroud 44 having an O-ring 46, a coupling nut 48, a cable boot 50 and a heat shrink tube 52. FIG. 10 shows a cross-sectional view of the secondary distribution cable 20 and plug assembly 22 of FIG. 9. As in the previous embodiment, the shroud 44 has a generally cylindrical shape and keys engagement of the plug assembly 22 with the mating receptacle 28. The passageway of the shroud 44 is filled with epoxy that hardens to prevent relative movement between the shroud 44 and the cable 20. The shroud 44 defines alignment extensions 58 and 60. The alignment extensions 58 and 60 have slightly different shapes so that the plug assembly 22 and receptacle 28 mate only in one orientation. In preferred embodiments, this orientation is marked on the shroud 44 using alignment indicia 23 so that a less skilled field technician can readily mate the plug assembly 22 with the receptacle 28. As best shown in FIG. 1, the alignment indicia 23 is aligned with complimentary alignment indicia 25 disposed on the receptacle 28. Thereafter, the field technician engages the external threads of the coupling nut 48 with the internal threads of the receptacle 28 to secure the plug assembly 22 to the receptacle 28.

The exemplary embodiments described above provide a secondary distribution cable 20 having a plug assembly 22 that may be positioned and secured at any desired location along the length of the cable 20. The plug assembly 22 may be positioned and secured in the field without special tools, equipment, or training. Additionally, the physical connection may be easily connected or disconnected by merely mating or un-mating the plug assembly 22 with the receptacle 28 and engaging or disengaging threads of the coupling nut 48 with the threads of the receptacle 28. Thus, the secondary distribution cable 20 and plug assembly 22 of the present invention allows the deployment of multiple optical fibers, through a connector port 24 provided in a wall of a conventional network connection terminal in an easy and economical manner. Furthermore, the concepts of the present invention may be practiced with other fiber optic cables, connectors and/or other cable configurations.

The foregoing is a description of various embodiments of the invention that are given here by way of example only. Although fiber optic cable and plug assemblies have been described with reference to preferred embodiments and examples thereof, other embodiments and examples may perform similar functions and/or achieve similar results. All such equivalent embodiments and examples are within the spirit and scope of the present invention and are intended to be covered by the appended claims.

What is claimed is:

1. A plug assembly for a fiber optic cable, the plug assembly positioned and secured at a desired location along the length of the fiber optic cable and adapted to engage a receptacle disposed within a connector port, at least a portion of the fiber optic cable passing through the plug assembly and the connector port, and wherein the fiber optic cable is strain relieved at the connector port and is not terminated at the plug assembly;

the plug assembly further comprising, a shroud secured to the fiber optic cable, the shroud having one or more extensions at a forward end thereof for aligning the plug assembly with the receptacle;

a coupling nut operable for securing the plug assembly within the receptacle;

a heat shrink tube for sealing between the shroud and the fiber optic cable, the heat shrink tube being disposed about a portion of the shroud and an outer portion of the fiber optic cable; and a boot for providing bending strain relief to the fiber optic cable adjacent the plug assembly.

2. The plug assembly of claim 1, further comprising:

a crimp body defining two half-shells having a clamping portion for securing the fiber optic cable within the plug assembly, the crimp body being disposed between the fiber optic cable and the shroud; and a crimp band disposed about the crimp body for holding the two half-shells together.

3. The plug assembly of claim 2, wherein the fiber optic cable comprises one or more strength components and wherein the crimp body is disposed about at least one of the strength components of the fiber optic cable.

4. The plug assembly of claim 1, wherein at least one of the shroud and the receptacle have alignment indicia for indicating a mating orientation.

5. The plug assembly of claim 1, wherein the shroud defines a recess and the shroud is secured to the fiber optic cable by an epoxy disposed within the recess.

6. The plug assembly of claim 1, wherein the fiber optic cable comprises an optical transmission component containing a plurality of light waveguides disposed within a cable jacket.

7. A fiber optic cable and plug assembly, comprising:

a fiber optic cable comprising a cable jacket and an optical transmission component disposed within the cable jacket; and a plug assembly adapted to be positioned and secured at any desired location along the length of the fiber optic cable, the plug assembly comprising:

a shroud disposed about the fiber optic cable at the desired location, the shroud having means for mating the plug assembly with a receptacle disposed within a connector port provided in a wall of a connection terminal; and a coupling nut having a means for securing the plug assembly within the receptacle;

wherein at least a portion of the fiber optic cable passes through the plug assembly and the receptacle into in the connection terminal, and wherein the fiber optic cable is not terminated at the plug assembly;

the plug assembly further comprising, a heat shrink tube for sealing between the shroud and the fiber optic cable; and a boot for providing bending strain relief to the fiber optic cable.

8. The fiber optic cable and plug assembly of claim 7, wherein the plug assembly further comprises:

a crimp body defining two half-shells having a clamping portion for securing the fiber optic cable within the plug assembly, the crimp body being disposed between the fiber optic cable and the shroud; and a crimp band disposed about the crimp body for holding the two half-shells together.

9. The fiber optic cable and plug assembly of claim 8, wherein the fiber optic cable comprises one or more strength components and wherein the crimp body is disposed about at least one of the strength components of the fiber optic cable.

10. The fiber optic cable and plug assembly of claim 7, wherein at least one of the shroud and the receptacle have an alignment indicia for indicating a mating orientation.

11. The fiber optic cable and plug assembly of claim 7, wherein the shroud defines a recess and the shroud is secured to the fiber optic cable by an epoxy disposed within the recess.

12. The fiber optic cable and plug assembly of claim 7, wherein the fiber optic cable comprises an optical transmission component containing a plurality of light waveguides disposed within a cable jacket.

* * * * *